United States Patent
Raz et al.

(10) Patent No.: US 8,463,781 B1
(45) Date of Patent: Jun. 11, 2013

(54) PRE-FETCH OF RECORDS IDENTIFIED BY AN INDEX RECORD

(75) Inventors: Yoav Raz, Newton, MA (US); Yechiel Yochai, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 1813 days.

(21) Appl. No.: 10/180,805

(22) Filed: Jun. 25, 2002

(51) Int. Cl.
G06F 17/30 (2006.01)

(52) U.S. Cl.
USPC .......................................................... 707/736

(58) Field of Classification Search
USPC ...... 707/1–10, 100–104.1, 200–205; 712/206
See application file for complete search history.

(56) References Cited

U.S. PATENT DOCUMENTS

| | | | | |
|---|---|---|---|---|
| 4,914,569 A * | 4/1990 | Levine et al. | | 1/1 |
| 5,551,027 A * | 8/1996 | Choy et al. | | 1/1 |
| 5,701,480 A * | 12/1997 | Raz | | 718/101 |
| 5,734,884 A * | 3/1998 | Eberhard et al. | | 707/2 |
| 5,812,996 A * | 9/1998 | Rubin et al. | | 707/2 |
| 5,822,749 A * | 10/1998 | Agarwal | | 707/2 |
| 5,887,151 A * | 3/1999 | Raz et al. | | 712/206 |
| 5,925,100 A * | 7/1999 | Drewry et al. | | 709/219 |
| 5,960,194 A * | 9/1999 | Choy et al. | | 1/1 |
| 5,963,945 A * | 10/1999 | Pal | | 1/1 |
| 6,003,022 A * | 12/1999 | Eberhard et al. | | 707/2 |
| 6,035,375 A * | 3/2000 | Yanai et al. | | 711/129 |
| 6,049,850 A * | 4/2000 | Vishlitzky et al. | | 711/136 |
| 6,055,622 A * | 4/2000 | Spillinger | | 712/207 |
| 6,144,970 A * | 11/2000 | Bonner et al. | | 707/206 |
| 6,195,661 B1 * | 2/2001 | Filepp et al. | | 1/1 |
| 6,304,873 B1 * | 10/2001 | Klein et al. | | 707/8 |
| 6,606,617 B1 * | 8/2003 | Bonner et al. | | 1/1 |
| 6,728,840 B1 * | 4/2004 | Shatil et al. | | 711/137 |
| 6,848,029 B2 * | 1/2005 | Coldewey | | 711/137 |
| 7,051,074 B1 * | 5/2006 | Buchsbaum et al. | | 709/206 |
| 2002/0046204 A1 * | 4/2002 | Hayes | | 707/1 |

\* cited by examiner

*Primary Examiner* — Syling Yen
(74) *Attorney, Agent, or Firm* — Occhiuti Rohlicek & Tsao LLP

(57) ABSTRACT

A method for pre-fetching database records from a database includes identifying an index record containing index entries that identify those database records. This information is then retrieved from the index entries and used to pre-fetch the database records.

2 Claims, 5 Drawing Sheets

| JAN | KEY_2 | • • • • | KEY_98 |
|---|---|---|---|
| FEB | KEY_4 | • • • • | KEY_97 |
| MAR | | | |
| APR | | | |
| MAY | | | |
| JUN | | | |
| JUL | | | |
| AUG | | | |
| SEP | | | |
| OCT | | | |
| NOV | | | |
| DEC | KEY_1, KEY_3 | • • • • | KEY_99 |
| UNKNOWN | | • • • • | |

FIG. 3

PRE-FETCH OF RECORDS IDENTIFIED BY AN INDEX RECORD

FIELD OF INVENTION

This invention relates to pre-fetching data.

BACKGROUND

In a data storage system, data can be stored on a mass-storage device or in a semiconductor memory. Mass-storage devices, such as disks, offer considerable capacity at low cost per unit of data stored, but long access times. In contrast, semiconductor memory provides much shorter access times at higher costs per unit of data stored.

Many database systems permit a user to write specialized database applications. These database applications often perform queries that require retrieval of records from one or more mass-storage devices. Each retrieval of a record requires accessing the mass-storage device to copy data to a semiconductor memory. In processing such queries, it is desirable to pre-fetch records and store them in the semiconductor memory. This reduces latency because the database application can then process records already in memory while another process pre-fetches additional records.

Pre-fetching records is effective at reducing latency only to the extent that the pre-fetched records are actually sought by the database application. The success of a pre-fetch policy thus depends on the extent to which one can correctly anticipate the needs of a database application.

SUMMARY

In many cases, a database application uses an index to determine what database records to read from a database. Using an index, a database application can avoid unnecessarily reading database records from the database. The invention is based on the recognition that when a database application reads an index record from an index, it is highly probable that the database application will soon be requesting database records identified by that index record.

The invention thus provides, in one aspect, a method for pre-fetching database records from a database. The method includes identifying an index record from an index derived from the database and retrieving, from that index record, information identifying one or more selected database records. These database records are then pre-fetched from the database.

In one practice of the invention, the index record is identified by observing I/O activity of a database application. This can include, for example, detecting a database application's access to an index record. The observed I/O activity provides a basis for identifying an index record.

In another practice, the database application itself is modified to use services provided by the data storage system. This practice thus includes retrieving information by providing a retrieval service to be accessed by a database application. The retrieval service is configured to retrieve information from an index record specified by the database application.

In certain cases, the information obtained in an index record does not directly address a database record. In such cases, the invention can include providing a translation service to be accessed by the database application. The translation service is configured to determine, on the basis of information identifying a selected database record, a physical address of that database record.

Other practices of the invention include those in which identifying an index record includes executing a database application having an instruction that, when executed, causes the database application to access the index record or to report access to the index record.

Another aspect of the invention includes a data-storage system having a mass-storage device and a memory. A database is stored on the mass storage device and an index derived from that database is stored in the memory. The index includes an index record identifying one or more selected database records from the database. A process executing on the system is configured to pre-fetch the selected database records.

In one embodiment, the process is configured to observe I/O activity of a database application and to pre-fetch the selected database records in response to the I/O activity. The process can, for example, be configured to detect access of an index record by the database application and to pre-fetch selected database records identified by the index record.

In some embodiments, the process configured to pre-fetch the selected database record can be a process distinct from the database application. However, in other embodiments, the process configured to pre-fetch the selected database record and the database application are the same process.

These and other features of the invention will be apparent from the following detailed description and the accompanying drawings, in which:

BRIEF DESCRIPTION OF THE FIGURES

FIG. 3 shows an index derived from the database stored in FIG. 2; and

DETAILED DESCRIPTION

Figure 1:
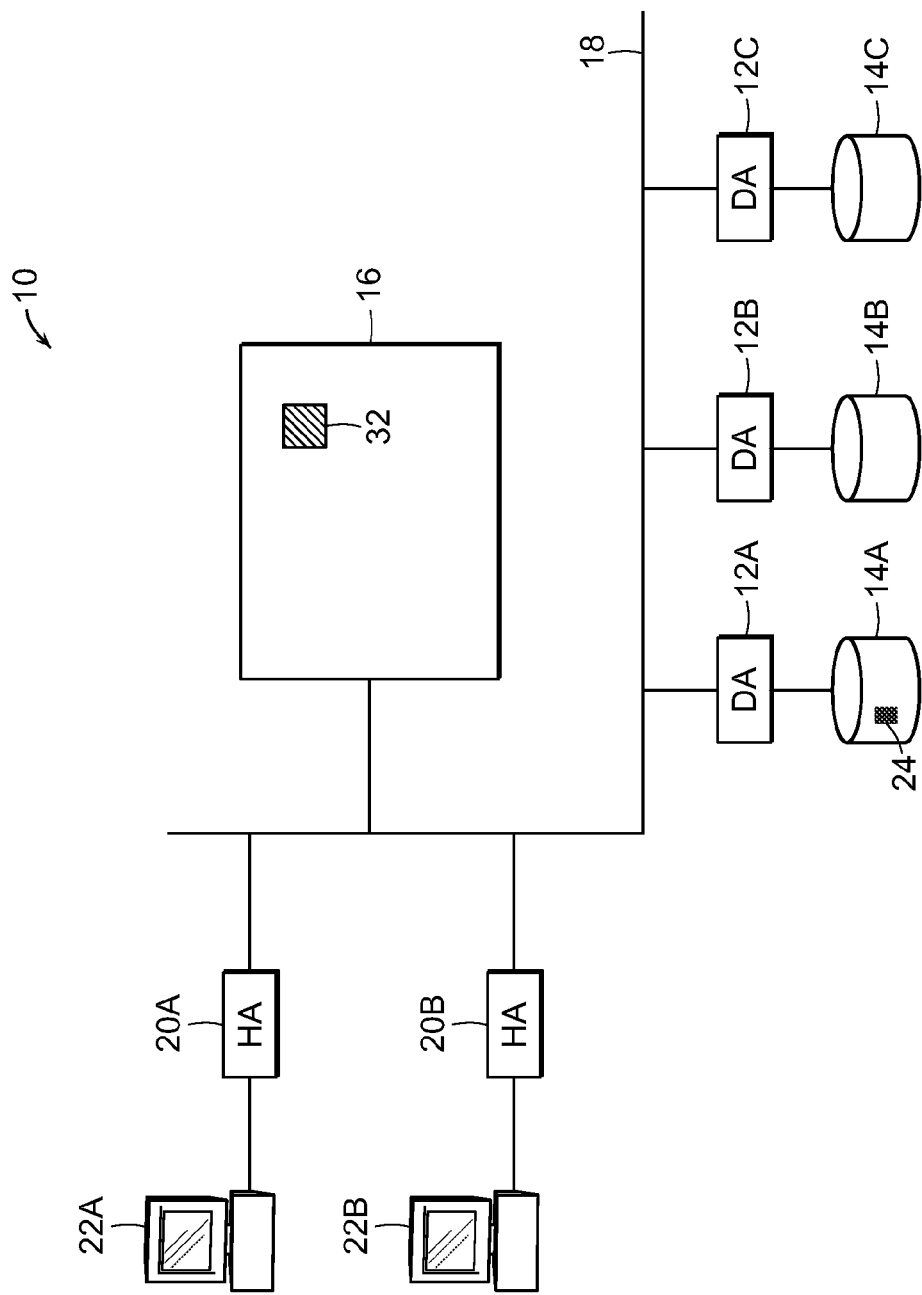
FIG. 1 shows a data storage system.

A data storage system 10, shown in FIG. 1, includes several disk adaptors 12A-C, each of which is in communication with a disk 14A-C and with a global memory 16 over a bus 18. In practice, each disk adaptor 12A-C controls several disks, however for purposes of this description, these disks can be considered as one logical disk 14A-C.

A host adaptor 20A-B, also in communication with the global memory 16, provides an interface with a host 22A-B. Executing on the hosts 22A-B are database-applications that periodically require access to selected database records of a relational database 24 stored on one or more of the disks 14A-C. In response to a database-application's request for a database record, the data storage system 10 determines if a copy of that database record is present in global memory 16. If so, the database record is provided to the database-application directly from the global memory 16. Otherwise, the data storage system 10 causes the appropriate disk adaptor 12A-C to copy that database record from a disk 14A-C into the global memory 16. Then, once the database record is in global memory 16, the data storage system 10 provides it to the requesting application.

Figure 2:
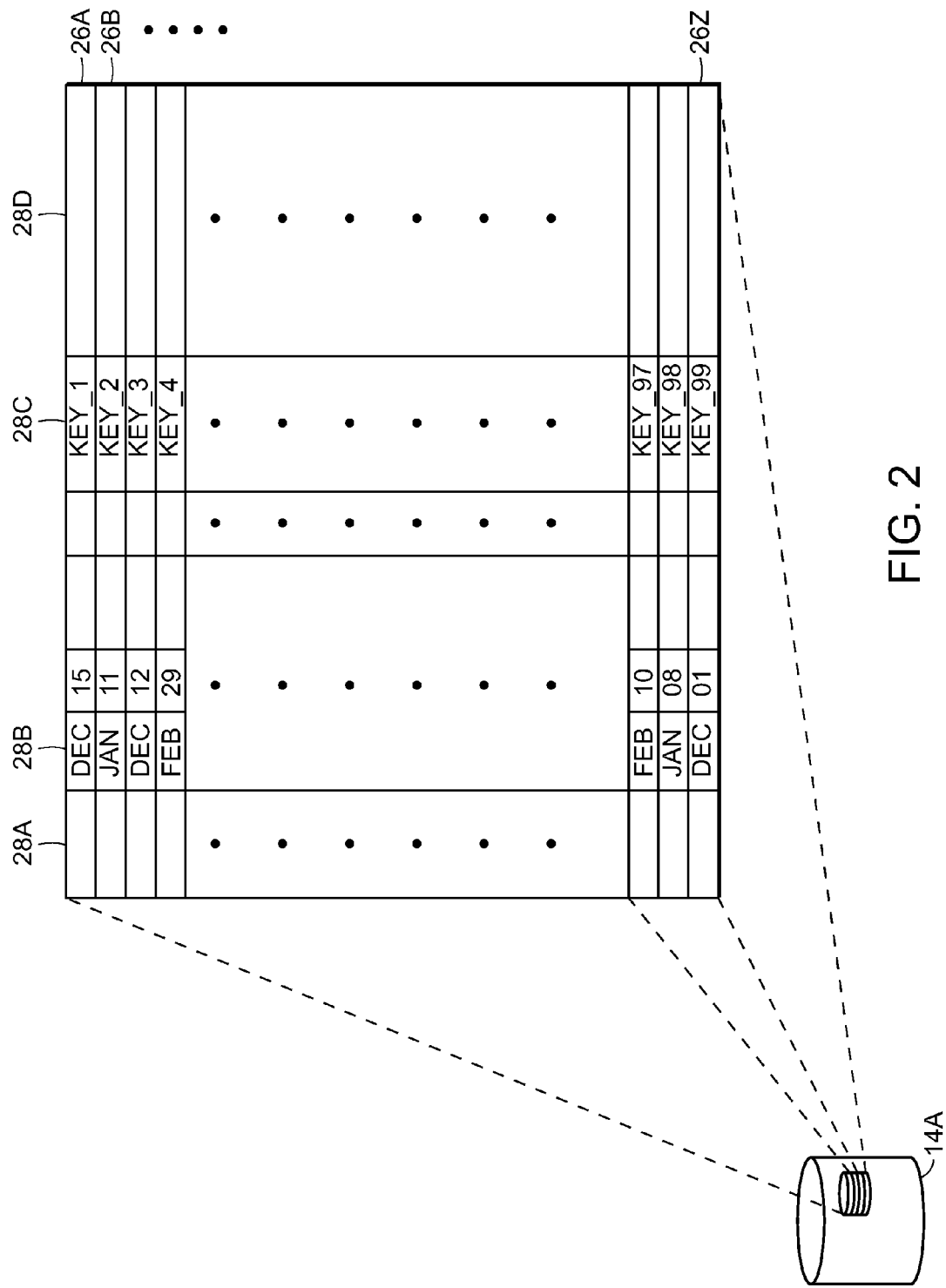
FIG. 2 shows a database stored on a disk of the data storage system of FIG. 1.

The relational database 24, shown in more detail in FIG. 2, includes a large number of database records 26A-Z, each of which is divided into fields 28A-D. Each database record 26A is identified by a unique key 30A. In FIG. 1, the key 30A is shown as being stored in one of the fields 28C of its associated database record 26A. However, the keys 30A-Z need not be a stored in a field within the database 24. What is important is that no two database records in the database 24 have the same key.

In many cases, a database-application executes a query requiring the retrieval of all database records in which a designated field 28B has a specified value. For example, a bank may want to identify all customers born in a particular month. One way to process such queries, the database-application is to examine each database record 26A-Z to determine if the designated field 28B of that database record has the specified value. This requires that all database records 26A-Z, even those that will ultimately be of no interest, be examined. Consequently, a query of this type triggers a time-consuming disk-access operation for each database record (except for those already in the global memory 16) regardless of whether that database record is one that is ultimately of interest. When such queries are made frequently enough, it is desirable to maintain, in the global memory 16, an index 32 of all database records on the basis of the designated field 28B.

As shown in FIG. 3, an index 32 can be viewed as a table in which each row corresponds to an allowed value 34 of the designated field 28B. Each allowed value 34 has associated with it one or more index records 38, each of which can contain one or more index entries 39. Each index entry 39 identifies a database record 26A-Z within the database 24 for which the designated field 28B has, as its value, that allowed value 34. Since a key 30A-Z is what uniquely identifies a database record, each index record 38 typically includes a listing of keys 30A-Z identifying database records 36A-Z for which the value of the designated field 28B is the allowed value associated with that index record 38.

In FIG. 3, and as described above, the value in the designated field 28B is shown as being the value of one of the database fields 28A-D. However, the value in the designated field 28B can also be derived from values of one or more database fields 28A-D. For example, a bank may want to retrieve database records for all residents of Smallville whose surname begins with the letter "K". In this case, the value of the index field 28B is derived from a Boolean "AND" of a surname field and a city field from the database 24.

When an index 32 is maintained, the identification of database records having specified values in the designated field 28B is effectively carried out in advance. Using an index, a database-application can look up a listing of those database records that have a particular allowed value 34 and retrieve only those database records. This reduces the number of disk access operations, and hence the latency associated with processing the query.

The latency is further reduced by pre-fetching the database records listed in an index entry 34A-K. One way this can be achieved is by monitoring the I/O operations of the database-application. If the database-application is observed to access an index record 38, it is likely that that database-application will ultimately retrieve all the database records identified in that index record 38. To the extent that they are not already in memory, the database records identified in that index record 38 are then pre-fetched. Another way this can be achieved is by modifying the database application itself to include instructions that cause a pre-fetch of database records identified in an index record 38 upon reading that index record 38. Yet another way to achieve this is to modify the database system to cause a pre-fetch of database records identified in an index record 38 when a database application being executed in conjunction with that database system reads that index record 38.

The data processing system 10 provides a number of services that are available to database-applications and database systems. These services include a translation service and a pre-fetch service. The translation service translates a key 30A-Z associated with a database record 26A-Z into a physical address of that database record 26A-Z. The pre-fetch service retrieves data from a specified physical address and stores that data in the global memory 16. These services are described in U.S. Pat. No. 5,887,151, the contents of which are herein incorporated by reference.

Figure 4:
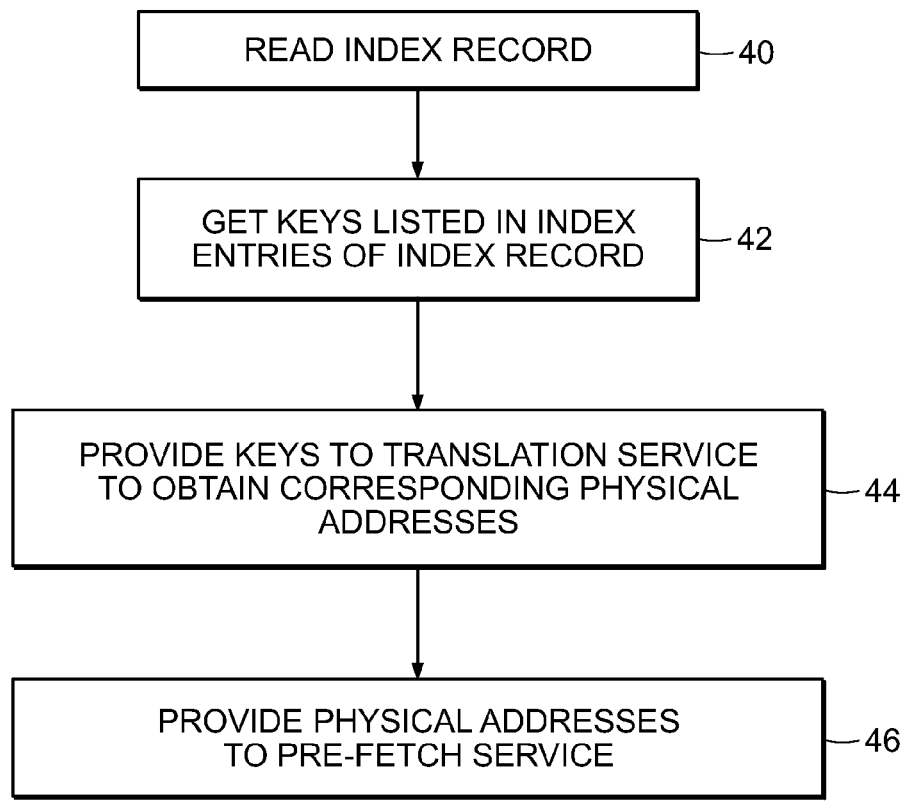
FIGS. 4 and 5 are flow charts of pre-fetch methods.

In one practice of the invention, a database-application is modified to include calls to both of these services. In another practice of the invention, it is the database system itself that is modified so that whenever a database application executing in conjunction with that database system accesses an index entry, the database system causes calls to both of these services to be generated. In either case, and with reference to FIG. 4, the database-application reads an index record (step 40) and obtains therefrom a list of keys identifying database records of interest (step 42). The database-application then provides those keys to the address translation service (step 44), which then returns the physical addresses corresponding to those keys. These physical addresses are then provided to the pre-fetch service (step 46), which begins copying the desired database records from the disk 14A into the global memory 16.

Figure 5:
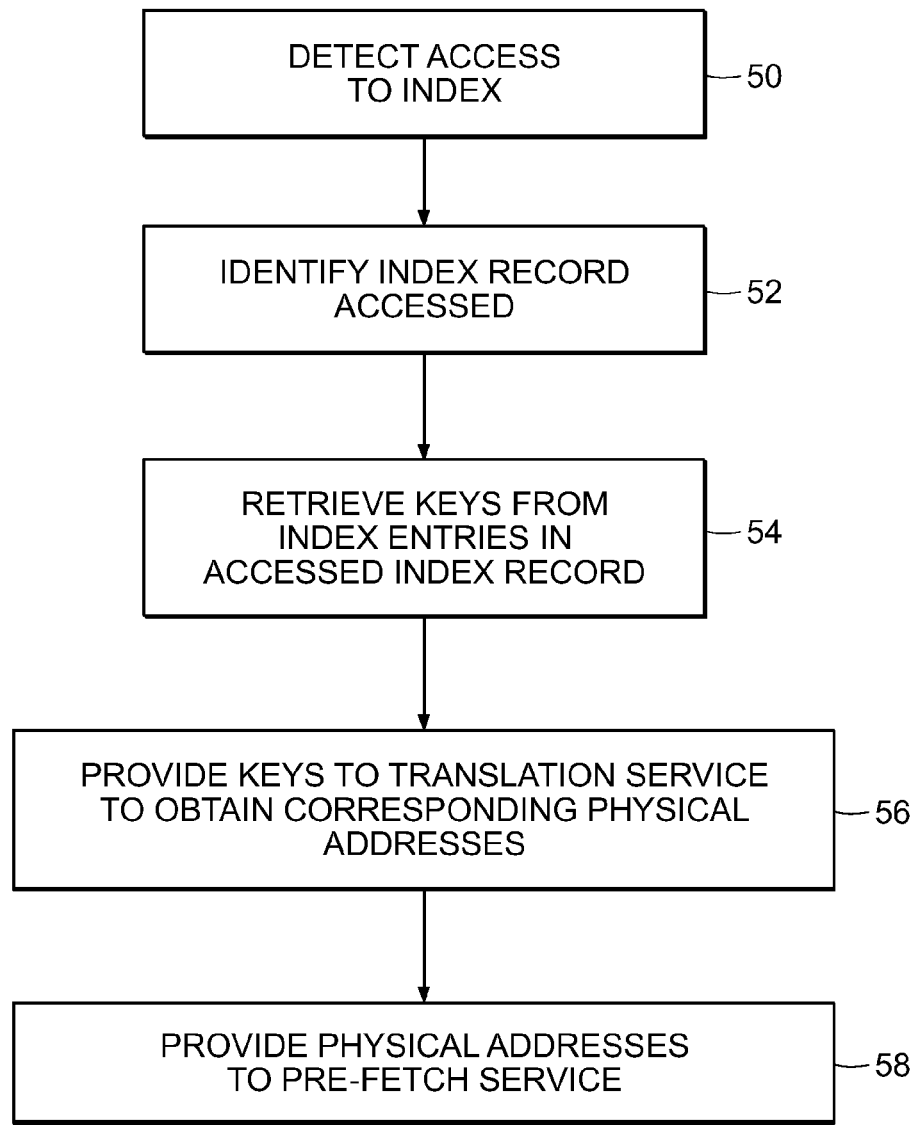

In another practice of the invention, shown in FIG. 5, no modification of the database-application or database system is required. In this case, a snooping process constantly monitors I/O requests made by the database-application. If the snooping process detects that the database-application has accessed an index 32 (step 50), it identifies which index record 38 was accessed (step 52). The snooping process can then access the same index record 34A-K and retrieve the keys listed in the index entries of that index record (step 54). The snooping process then calls the address translator (step 56) and the pre-fetch service (step 58) as described in connection with FIG. 4.

The pre-fetching of database records as described above provides significant performance increases, particularly when a database 24 is striped across several disks 14A-C managed by several disk adaptors 12A-C. In such a case, the disk adaptors 12A-C can retrieve database records in parallel with each other, thereby completing several pre-fetch operations in the time it takes to complete a single pre-fetch operation.

A performance advantage accrues even when the database 24 is entirely on one disk 14A. In such a case, since all physical addresses to be retrieved are provided to the disk adaptor 12A at the same time, the disk adaptor 12A can rearrange the order in which data is retrieved so as to reduce the time required to retrieve all the data. For example, if the first and last physical addresses on the list were located next to each other on the disk 14A, the disk adaptor 12A could retrieve data for those two physical addresses consecutively. Such optimization is not possible when physical addresses are provided one at a time to the disk adaptor 12A.

Having described the invention, and a preferred embodiment thereof, what we claim as new, and secured by Letters Patent is:

1. A method for pre-fetching, from a database having a plurality of database records, each of which has a first field and a plurality of other fields, all those database records that have a specified value stored in said first field, said method comprising:

providing a database index having a plurality of index records, each index record corresponding to an allowed value, wherein each index record includes index-recordidentification keys that identify all database records that have a particular allowed value stored in said first field;

identifying, within said database index, an index record in which said particular allowed value corresponding to said index record is the same as said specified value;

retrieving, from said index record, database-record-identification keys that provide information identifying those database records in which said first field stores a value that is the same as said specified value;

on the basis of said information provided by said database-record-identification keys retrieved from said index record, pre-fetching, from said database, database records in which said first field stores a value that is the same as said specified value; and wherein identifying an index record comprises executing a database application having an instruction that, when executed, causes said database application to report access to said index record.

2. A method for pre-fetching database records from a database, said method comprising:

identifying an index record from an index, each index record of the index corresponding to an allowed value in a database record;

retrieving, from said index record, information identifying database records having the allowed value that corresponds to the identified index record; and pre-fetching, from said database, at least one of said database records identified by said index record, wherein identifying an index record comprises executing a database application having an instruction that, when executed, causes said database application to report access to said index record.

* * * * *